United States Patent
Li et al.

(10) Patent No.: US 8,750,347 B2
(45) Date of Patent: Jun. 10, 2014

(54) CODE CHANNEL DETECTING METHOD AND RELATED DEVICE AND COMMUNICATION SYSTEM

(71) Applicant: Huawei Technologies Co., Ltd., Guangdong (CN)

(72) Inventors: Feng Li, Shanghai (CN); Chunling Zhang, Shanghai (CN); Wenkang Guan, Shanghai (CN); Jing Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/715,717

(22) Filed: Dec. 14, 2012

(65) Prior Publication Data
US 2013/0188669 A1 Jul. 25, 2013

(30) Foreign Application Priority Data

Dec. 16, 2011 (CN) .......................... 2011 1 0424191

(51) Int. Cl.
*H04L 27/01* (2006.01)
(52) U.S. Cl.
USPC ........... 375/147; 375/149; 375/150; 375/152; 375/316; 375/340; 375/343; 375/346
(58) Field of Classification Search
USPC ......... 375/147, 149, 150, 152, 316, 340, 343, 375/346
See application file for complete search history.

(56) References Cited

U.S. PATENT DOCUMENTS

| | | | |
|---|---|---|---|
| 6,983,125 B2 * | 1/2006 | Smee et al. | 455/63.1 |
| 7,876,808 B2 * | 1/2011 | Catreux-Erceg et al. | 375/140 |
| 2006/0114974 A1 * | 6/2006 | Zeira et al. | 375/148 |
| 2010/0272155 A1 | 10/2010 | Lomp et al. | |
| 2012/0231798 A1 * | 9/2012 | Jian | 455/437 |

FOREIGN PATENT DOCUMENTS

| | | |
|---|---|---|
| CN | 101098208 A | 1/2008 |
| CN | 101557262 A | 10/2009 |
| CN | 101640549 A | 2/2010 |
| CN | 101651464 A | 2/2010 |
| CN | 102185631 A | 9/2011 |
| WO | 2004107624 A1 | 12/2004 |
| WO | 2009138946 A1 | 11/2009 |

OTHER PUBLICATIONS

Foreign Communication From a Counterpart Application, Chinese Application No. 201110424191.0, Chinese Office Action dated Dec. 4, 2013, 5 pages.

* cited by examiner

*Primary Examiner* — Siu Lee
(74) *Attorney, Agent, or Firm* — Conley Rose, P.C.; Grant Rodolph; Nicholas K. Beaulieu

(57) ABSTRACT

Embodiments of the present invention disclose a code channel detecting method and a related device and a communication system. In the solutions provided by the embodiments of the present invention, whether a DPA code channel is in an active state is determined with multiple thresholds based on a first reference value and a third reference value, or based on a first reference value, a second reference value and a third reference value. This mechanism takes multiple possible false determination situations into consideration, thereby ensuring a code channel correct detection rate in multiple interference scenarios and relatively reducing a false alarm rate.

12 Claims, 4 Drawing Sheets

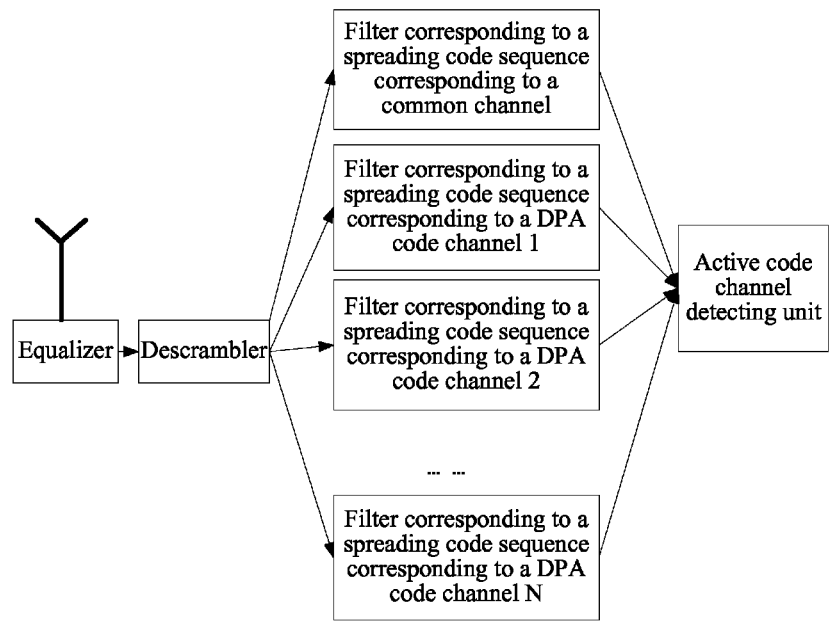
FIG. 3
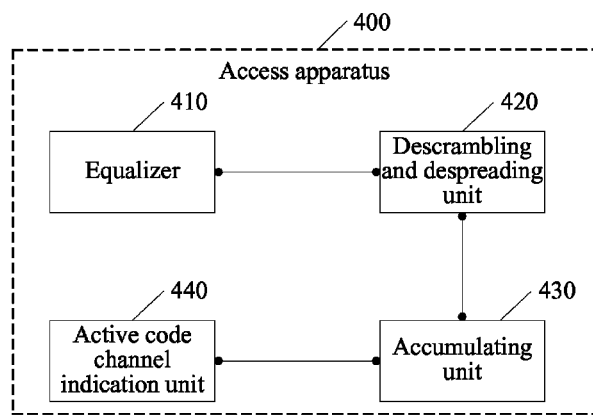
FIG. 4-a

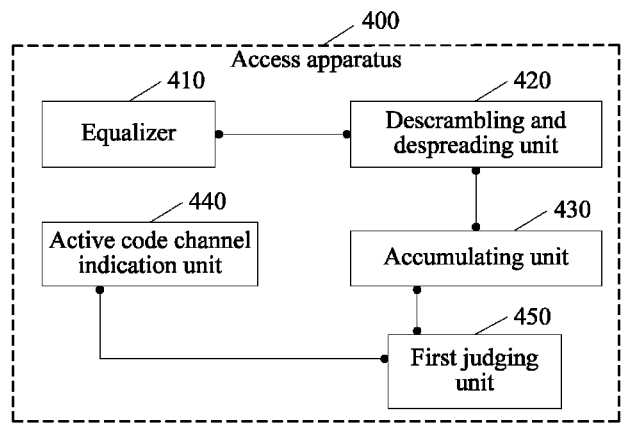
FIG. 4-b
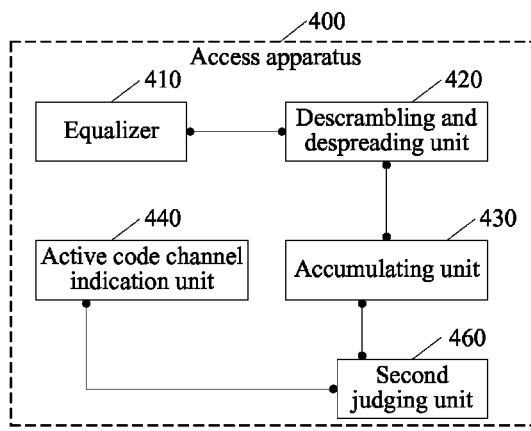
FIG. 4-c
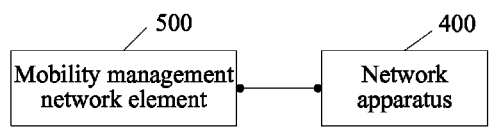
FIG. 5

US 8,750,347 B2

CODE CHANNEL DETECTING METHOD AND RELATED DEVICE AND COMMUNICATION SYSTEM

CROSS-REFERENCE TO RELATED APPLICATIONS

This application claims priority to Chinese Patent Application No. 201110424191.0, filed on Dec. 16, 2011, which is hereby incorporated by reference in its entirety.

FIELD OF THE INVENTION

The present invention is related to the field of communications technologies, and in particular, to a code channel detecting method and a related device and a communication system.

BACKGROUND OF THE INVENTION

Currently, on a downlink of a high speed wireless communication system, such as a code division multiple access (CDMA, Code Division Multiple Access) system, each user equipment (UE, User Equipment) generally only knows about some channel information of its own, and a blind interference suppression algorithm is implemented on other UEs. Because the CDMA system and the like are interference limited systems, to employ a higher level interfering user suppression algorithm to improve the system capacity, more related information about the interfering user needs to be acquired, for example, the number of code channels occupied by each UE, and whether a new user accesses the system can be determined by detecting the number of the active code channels.

The existing code channel detecting technology is to determine whether a code channel is active by using a noise threshold, and when the noises are not accurately estimated, it is difficult to achieve a desirable code channel correct detection rate and a desirable false alarm rate in the prior art. Besides, this simple noise threshold determination cannot guarantee that the desirable code channel correct detection rate and false alarm rate are achieved in every interference scenario, especially in a scenario with weak interference.

SUMMARY OF THE INVENTION

Embodiments of the present invention provide a code channel detecting method and a related device and a communication system, to improve a code channel correct detection rate and reduce a false alarm rate.

In one aspect, an embodiment of the present invention provides a code channel detecting method, which includes:
  equalizing a received signal to obtain an equalized signal;
  descrambling and despreading the equalized signal using a spreading code sequence corresponding to each downlink packet access DPA code channel, and performing energy accumulation on a symbol corresponding to each DPA code channel and acquired after the descrambling and despreading, so as to obtain a symbol energy accumulated value corresponding to each DPA code channel; and
  if the symbol energy accumulated value corresponding to the DPA code channel satisfies an active code channel determination condition, indicating the DPA code channel as an active code channel, where
  the active code channel determination condition includes that:
    the symbol energy accumulated value corresponding to the DPA code channel is greater than a first reference value and greater than a third reference value; or
    the symbol energy accumulated value corresponding to the DPA code channel is greater than a first reference value and greater than a third reference value, and at least one of symbol energy accumulated values corresponding to DPA code channels is greater than a second reference value, where the first reference value is determined based on a first threshold and estimated in-band noises, and the in-band noises are noises within system working bandwidth corresponding to the DPA code channel; the third reference value is determined based on a maximum symbol energy accumulated value in the symbol energy accumulated values greater than the first reference value and a third threshold; and the second reference value is determined based on a second threshold and a second symbol energy accumulated value, where the second symbol energy accumulated value is obtained by performing energy accumulation on a symbol acquired after the equalized signal is descrambled and despread using a spreading code sequence corresponding to a common channel.

In another aspect, an embodiment of the present invention provides a network apparatus, which includes:
  an equalizer, configured to equalize a received signal to obtain an equalized signal;
  a descrambling and despreading unit, configured to descramble and despread the equalized signal using a spreading code sequence corresponding to each downlink packet access DPA code channel;
  an accumulating unit, configured to perform energy accumulation on a symbol corresponding to each DPA code channel and acquired after the descrambling and despreading processing of the descrambling and despreading unit, to obtain a symbol energy accumulated value corresponding to each DPA code channel; and
  an active code channel indication unit, configured to indicate the DPA code channel as an active code channel, if the symbol energy accumulated value corresponding to the DPA code channel satisfies an active code channel determination condition, where
  the active code channel determination condition includes that:
    the symbol energy accumulated value corresponding to the DPA code channel is greater than a first reference value and greater than a third reference value; or
    the symbol energy accumulated value corresponding to the DPA code channel is greater than a first reference value and greater than a third reference value, and at least one of symbol energy accumulated values corresponding to DPA code channels is greater than a second reference value, where the first reference value is determined based on a first threshold and estimated in-band noises, and the in-band noises are noises within system working bandwidth corresponding to the DPA code channel; the third reference value is determined based on a maximum symbol energy accumulated value in the symbol energy accumulated values greater than the first reference value and a third threshold; and the second reference value is determined based on a second threshold and a second symbol energy accumulated value, where the second symbol energy accumulated value is obtained by performing energy accumulation on a symbol acquired after the equalized signal is descrambled and despread using a spreading code sequence corresponding to a common channel.

In another aspect, an embodiment of the present invention further provides a communication system, which includes:
  a mobility management apparatus and the network apparatus provided in the foregoing embodiment, where the mobility management apparatus is connected to the network apparatus in a communication mode.

In view of the above, in the solutions provided by the embodiments of the present invention, whether a DPA code channel is in an active state is determined with multiple thresholds based on a first reference value and a third reference value, or based on a first reference value, a second reference value and a third reference value, where the first reference value is determined based on a first threshold and estimated in-band noises; the third reference value is determined based on a maximum symbol energy accumulated value in symbol energy accumulated values greater than the first reference value and a third threshold; and the second reference value is determined based on a second threshold and a second symbol energy accumulated value, where the second symbol energy accumulated value is obtained by performing energy accumulation on a symbol acquired after an equalized signal is descrambled and despread using a spreading code sequence corresponding to a common channel. This mechanism takes multiple possible false determination situations into consideration, thereby ensuring a code channel correct detection rate in multiple interference scenarios and relatively reducing a false alarm rate.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following descriptions merely show some of the embodiments of the present invention, and persons of ordinary skill in the art can derive other drawings from these accompanying drawings without creative efforts.

FIG. 3 is a schematic diagram of a code channel detecting device according to an embodiment of the present invention;

FIG. 4-$a$ is a schematic diagram of a network apparatus according to an embodiment of the present invention;

FIG. 4-$b$ is a schematic diagram of another network apparatus according to an embodiment of the present invention;

FIG. 4-$c$ is a schematic diagram of another network apparatus according to an embodiment of the present invention; and FIG. 5 is a schematic diagram of a communication system according to an embodiment of the present invention.

DETAILED DESCRIPTION OF THE EMBODIMENTS

Embodiments of the present invention provide a code channel detecting method and a related device and a communication system, to improve a code channel correct detection rate and relatively reduce a false alarm rate.

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

An embodiment of a code channel detecting method according to the present invention may include: equalizing a received signal to obtain an equalized signal; descrambling and despreading the equalized signal using a spreading code sequence corresponding to each downlink packet access (DPA, Downlink Packet Access) code channel, and performing energy accumulation on a symbol that is corresponding to each DPA code channel and is acquired after the descrambling and despreading, to obtain a symbol energy accumulated value corresponding to each DPA code channel; and if the symbol energy accumulated value corresponding to the DPA code channel satisfies an active code channel determination condition, indicating the DPA code channel as an active code channel, where the active code channel determination condition includes that: the symbol energy accumulated value corresponding to the DPA code channel is greater than a first reference value and greater than a third reference value; or the symbol energy accumulated value corresponding to the DPA code channel is greater than a first reference value and greater than a third reference value, and at least one of symbol energy accumulated values corresponding to DPA code channels is greater than a second reference value, where the first reference value is determined based on a first threshold and estimated in-band noises, and the in-band noises are noises within system working bandwidth corresponding to the DPA code channel; the third reference value is determined based on a maximum symbol energy accumulated value in the symbol energy accumulated values greater than the first reference value and a third threshold; and the second reference value is determined based on a second threshold and a second symbol energy accumulated value, and the second symbol energy accumulated value is obtained by performing energy accumulation on a symbol acquired after the equalized signal is descrambled and despread using a spreading code sequence corresponding to a common channel.

Figure 1:
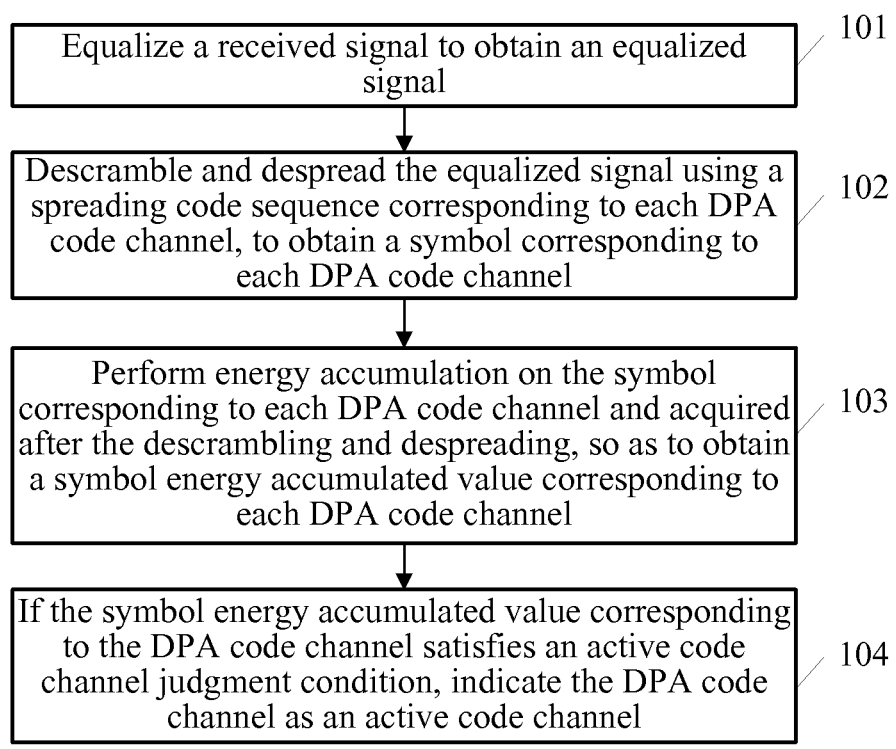
FIG. 1 is a schematic flow chart of a code channel detecting method according to an embodiment of the present invention.

Referring to FIG. 1, FIG. 1 is a schematic flow chart of a code channel detecting method according to an embodiment of the present invention.

101: Equalize a received signal to obtain an equalized signal.

102: Descramble and despread the equalized signal using a spreading code sequence corresponding to each DPA code channel, to obtain a symbol corresponding to each DPA code channel.

103: Perform energy accumulation on the symbol that is corresponding to each DPA code channel and is acquired after the descrambling and despreading, to obtain a symbol energy accumulated value corresponding to each DPA code channel.

It is assumed that N (for example, 15) DPA code channels exist and each DPA code channel corresponds to a spreading code sequence, the equalized signal is descrambled and despread using the spreading code sequence corresponding to each DPA code channel, to obtain a symbol corresponding to each of the N DPA code channels, and energy accumulation is performed on the symbol that is corresponding to each DPA code channel and is acquired after the descrambling and despreading, to obtain a symbol energy accumulated value corresponding to each of the N DPA code channels, that is, to obtain N symbol energy accumulated values.

104: If the symbol energy accumulated value corresponding to a DPA code channel satisfies an active code channel determination condition, indicate the DPA code channel as an active code channel.

The active code channel determination condition includes that: the symbol energy accumulated value corresponding to the DPA code channel is greater than a first reference value and greater than a third reference value; or the symbol energy accumulated value corresponding to the DPA code channel is greater than a first reference value and greater than a third reference value, and at least one of the symbol energy accumulated values that are corresponding to the DPA code channels and are greater than the first reference value is greater than a second reference value, where the first reference value is determined based on a first threshold and estimated in-band noises (for example, the first threshold is multiplied by the estimated in-band noises to obtain the first reference value); the third reference value is determined based on a maximum symbol energy accumulated value in the symbol energy accumulated values greater than the first reference value and a third threshold (for example, the maximum symbol energy accumulated value in the symbol energy accumulated values greater than the first reference value is multiplied by the third threshold to obtain the third reference value); and the second reference value is determined based on a second threshold and a second symbol energy accumulated value (for example, the second threshold is multiplied by the second symbol energy accumulated value to obtain the second reference value), where the second symbol energy accumulated value is obtained by performing energy accumulation on a symbol acquired after the equalized signal is descrambled and despread using a spreading code sequence corresponding to a common channel.

In actual applications, whether the symbol energy accumulated value corresponding to a DPA code channel satisfies the active code channel determination condition can be determined in multiple manners.

In an embodiment of the present invention, if the active code channel determination condition is that the symbol energy accumulated value corresponding to the DPA code channel is greater than the first reference value and greater than the third reference value, whether the active code channel determination condition is satisfied can be determined in the following manner: determining whether the symbol energy accumulated value corresponding to the DPA code channel is greater than the first reference value; if not, determining that the symbol energy accumulated value corresponding to the DPA code channel does not satisfy the active code channel determination condition; while if yes, further determining whether the symbol energy accumulated value corresponding to the DPA code channel is greater than the third reference value; if yes, determining that the symbol energy accumulated value corresponding to the DPA code channel satisfies the active code channel determination condition; while if not, determining that the symbol energy accumulated value corresponding to the DPA code channel does not satisfy the active code channel determination condition. Alternatively, it is determined whether the symbol energy accumulated value corresponding to the DPA code channel is greater than the third reference value; if not, it is determined that the symbol energy accumulated value corresponding to the DPA code channel does not satisfy the active code channel determination condition; while if yes, it is further determined whether the symbol energy accumulated value corresponding to the DPA code channel is greater than the first reference value; if yes, it is determined that the symbol energy accumulated value corresponding to the DPA code channel satisfies the active code channel determination condition; while if not, it is determined that the symbol energy accumulated value corresponding to the DPA code channel does not satisfy the active code channel determination condition. Of course, it can be determined whether the symbol energy accumulated value corresponding to the DPA code channel is greater than the first reference value and the third reference value simultaneously, and if yes, it is determined that the symbol energy accumulated value corresponding to the DPA code channel satisfies the active code channel determination condition; while if not, it is determined that the symbol energy accumulated value corresponding to the DPA code channel does not satisfy the active code channel determination condition. Alternatively, the first reference value and the third reference value are compared first, and then it is determined whether the symbol energy accumulated value corresponding to the DPA code channel is greater than the larger one of the first reference value and the third reference value; if yes, it is determined that the symbol energy accumulated value corresponding to the DPA code channel satisfies the active code channel determination condition; while if not, it is determined that the symbol energy accumulated value corresponding to the DPA code channel does not satisfy the active code channel determination condition.

In another embodiment of the present invention, if the active code channel determination condition is that the symbol energy accumulated value corresponding to the DPA code channel is greater than the first reference value and greater than the third reference value, and at least one of the symbol energy accumulated values corresponding to the DPA code channels is greater than the second reference value, whether the active code channel determination condition is satisfied can be determined in the following manner: determining whether the symbol energy accumulated value corresponding to the DPA code channel is greater than the first reference value; if not, determining that the symbol energy accumulated value corresponding to the DPA code channel does not satisfy the active code channel determination condition; while if yes, determining whether at least one of the symbol energy accumulated values that are corresponding to the DPA code channels and are greater than the first reference value is greater than the second reference value; if not, determining that the symbol energy accumulated value corresponding to the DPA code channel does not satisfy the active code channel determination condition; while if yes, further determining whether the symbol energy accumulated value corresponding to the DPA code channel is greater than the third reference value; if yes, determining that the symbol energy accumulated value corresponding to the DPA code channel satisfies the active code channel determination condition; while if not, determining that the symbol energy accumulated value corresponding to the DPA code channel does not satisfy the active code channel determination condition. Alternatively, it is determined whether the symbol energy accumulated value corresponding to the DPA code channel is greater than the third reference value; if not, it is determined that the symbol energy accumulated value corresponding to the DPA code channel does not satisfy the active code channel determination condition; while if yes, it is determined whether the symbol energy accumulated value corresponding to the DPA code channel is greater than the first reference value; if not, it is determined that the symbol energy accumulated value corresponding to the DPA code channel does not satisfy the active code channel determination condition; while if yes, it is further determined whether at least one of the symbol energy accumulated values that are corresponding to the DPA code channels and are greater than the first reference value or the third reference value is greater than the second reference value; if not, it is determined that the symbol energy accumulated value corresponding to the DPA code channel does not satisfy the active code channel determination condition;

while if yes, it is determined that the symbol energy accumulated value corresponding to the DPA code channel satisfies the active code channel determination condition. Alternatively, it is first determined whether the symbol energy accumulated value corresponding to the DPA code channel is greater than the third reference value; if not, it is determined that the symbol energy accumulated value corresponding to the DPA code channel does not satisfy the active code channel determination condition; while if yes, it is further determined whether at least one of the symbol energy accumulated values that are corresponding to the DPA code channels and are greater than the third reference value is greater than the second reference value; if not, it is determined that the symbol energy accumulated value corresponding to the DPA code channel does not satisfy the active code channel determination condition; while if yes, it is determined whether the symbol energy accumulated value corresponding to the DPA code channel is greater than the first reference value; if not, it is determined that the symbol energy accumulated value corresponding to the DPA code channel does not satisfy the active code channel determination condition; while if yes, it is determined that the symbol energy accumulated value corresponding to the DPA code channel satisfies the active code channel determination condition. Alternatively, the first reference value and the third reference value are compared first, and then it is determined whether the symbol energy accumulated value corresponding to the DPA code channel is greater than the larger one of the first reference value and the third reference value; if not, it is determined that the symbol energy accumulated value corresponding to the DPA code channel does not satisfy the active code channel determination condition; while if yes, it is further determined whether at least one of the symbol energy accumulated values that are corresponding to the DPA code channels and are greater than the first reference value or the third reference value is greater than the second reference value; if yes, it is determined that the symbol energy accumulated value corresponding to the DPA code channel satisfies the active code channel determination condition; while if not, it is determined that the symbol energy accumulated value corresponding to the DPA code channel does not satisfy the active code channel determination condition.

It can be understood that, the above determination steps may be performed in other orders to determine whether the symbol energy accumulated value corresponding to a DPA code channel satisfies the active code channel determination condition, and details are not repeated herein. The method in the embodiment of the present invention can be implemented by a processor or a dedicated integrated circuit.

In an application scenario, the first threshold is set in a range of, for example, 0.5 to 1.5 (or other values obtained through emulation). The second threshold is set in a range of, for example, 0.08 to 0.2 (or other values obtained through emulation). The third threshold is set in a range of, for example, 0.5 to 1 (or other values obtained through emulation).

It can be understood that, the method of this embodiment may be specifically implemented on an access apparatus (for example, a base station or a relay station), and of course, may be specifically implemented on another apparatus.

In view of the above, in the solution provided by this embodiment, whether a DPA code channel is in an active state is determined with multiple thresholds based on a first reference value and a third reference value, or based on a first reference value, a second reference value and a third reference value, where the first reference value is determined based on a first threshold and estimated in-band noises; the third reference value is determined based on a maximum symbol energy accumulated value in symbol energy accumulated values greater than the first reference value and a third threshold; and the second reference value is determined based on a second threshold and a second symbol energy accumulated value, where the second symbol energy accumulated value is obtained by performing energy accumulation on a symbol acquired after an equalized signal is descrambled and despread using a spreading code sequence corresponding to a common channel. This mechanism takes multiple possible false determination situations into consideration, thereby ensuring a code channel correct detection rate in multiple interference scenarios and relatively reducing a false alarm rate.

To better understand and implement the foregoing solution provided in the embodiment of the present invention, a specific application scenario is described below as an example for illustration.

Figure 2:
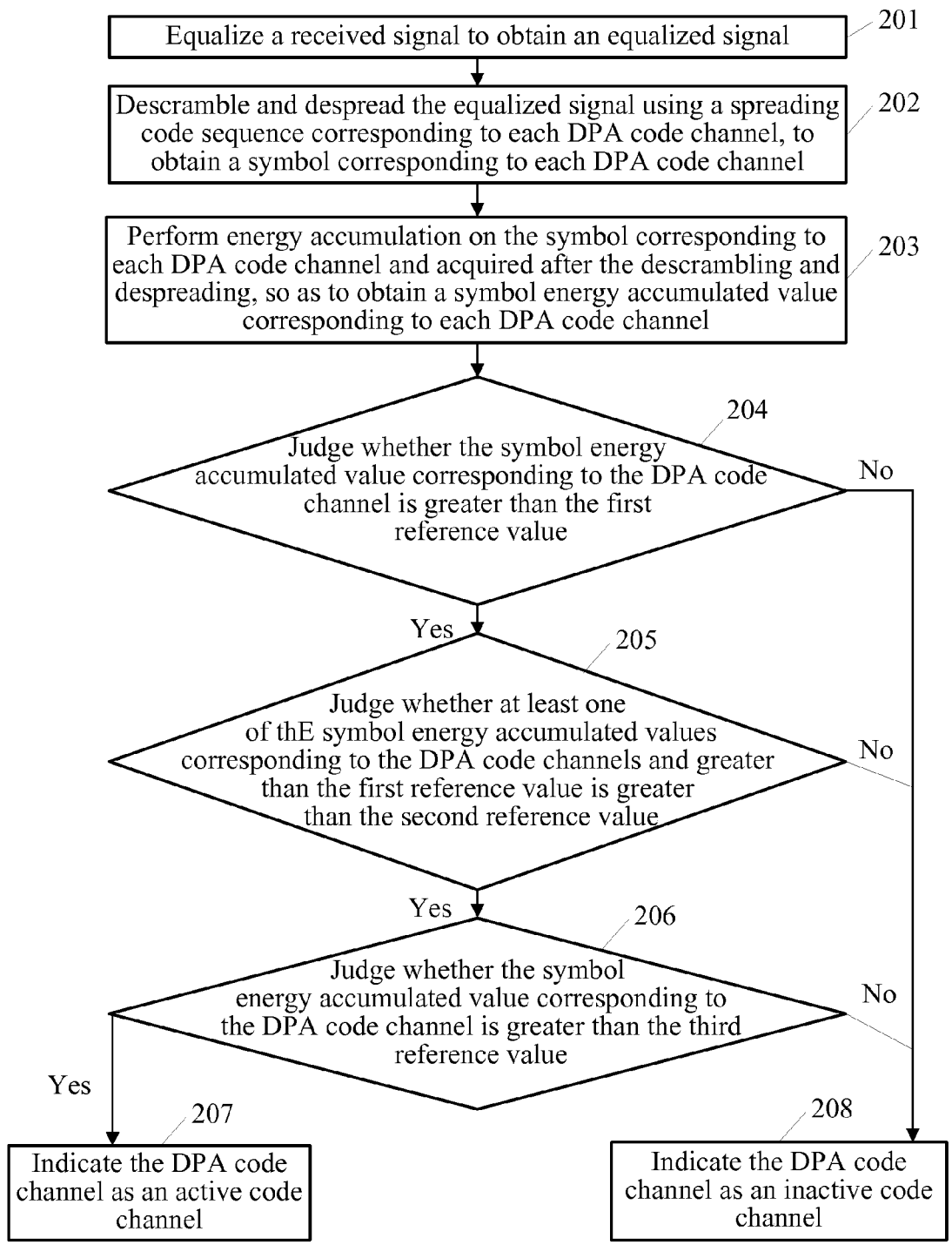
FIG. 2 is a schematic flow chart of another code channel detecting method according to an embodiment of the present invention.

Referring to FIG. 2, another code channel detecting method provided by an embodiment of the present invention includes:

201: Equalize a received signal to obtain an equalized signal.

202: Descramble and despread the equalized signal using a spreading code sequence corresponding to each DPA code channel, to obtain a symbol corresponding to each DPA code channel.

203: Perform energy accumulation on the symbol that is corresponding to each DPA code channel and is acquired after the descrambling and despreading, to obtain a symbol energy accumulated value corresponding to each DPA code channel.

It is assumed that N (for example, 15) DPA code channels exist and each DPA code channel corresponds to a spreading code sequence, the equalized signal is descrambled and despread using the spreading code sequence corresponding to each DPA code channel, to obtain a symbol corresponding to each of the N DPA code channels, and energy accumulation is performed on the symbol that is corresponding to each DPA code channel and is acquired after the descrambling and despreading, to obtain a symbol energy accumulated value corresponding to each of the N DPA code channels, that is, to obtain N symbol energy accumulated values.

204: Determine whether the symbol energy accumulated value corresponding to the DPA code channel is greater than the first reference value.

If yes, perform step 205.

If not, perform step 208.

The first threshold Thd1 may be multiplied by the estimated in-band noises to obtain the first reference value, and the first threshold Thd1 is set in a range of, for example, 0.5 to 1.5 (or other values obtained through emulation).

The in-band noises may be estimated in the following manner:

The equalized signal is descrambled and despread using a spreading code sequence corresponding to a common pilot channel (CPICH, Common Pilot Channel) to obtain a symbol corresponding to the CPICH, and in-band noises are estimated based on the symbol corresponding to the CPICH; of course, the in-band noises may be estimated in other manners in the prior art, which will not be repeated herein.

The symbol that is corresponding to each DPA code channel and is acquired after the descrambling and despreading may be represented by signal energy plus noise energy S+N, and the first reference value is represented by the first threshold Thd1*N', where N' is the estimated in-band noises. Because there is deviatation of noise estimatation between different systems, the first threshold Thd1 can be obtained or adjusted through system emulation.

205: Determine whether at least one of the symbol energy accumulated values that are corresponding to the DPA code channels and are greater than the first reference value is greater than the second reference value.

If yes, perform step 206.

If not, perform step 208.

For example, it is determined whether a maximum symbol energy accumulated value in the symbol energy accumulated values that are corresponding to the DPA code channels and are greater than the first reference value is greater than the second reference value.

It is assumed that 15 DPA code channels exist, the equalized signal is descrambled and despread using a spreading code sequence corresponding to each DPA code channel, to obtain a symbol corresponding to each of the 15 DPA code channels, and energy accumulation is performed on the symbol that is corresponding to each DPA code channel and is acquired after the descrambling and despreading, to obtain a symbol energy accumulated value corresponding to each of the 15 DPA code channels, that is, to obtain 15 symbol energy accumulated values. If 6 symbol energy accumulated values of the symbol energy accumulated values corresponding to the 15 DPA code channels are greater than the first reference value, it is determined whether the maximum value in the 6 symbol energy accumulated values is greater than the second reference value, and if yes, step 206 is performed; while if not, step 208 is performed.

The second threshold Thd2 may be multiplied by a second symbol energy accumulated value to obtain the second reference value, and the second symbol energy accumulated value is obtained by performing energy accumulation on a symbol acquired after the equalized signal is descrambled and despread using a spreading code sequence corresponding to a common channel.

Because the noises and the signal are affected by a fading channel, a false code channel may exist in the DPA code channels corresponding to the symbol energy accumulated values greater than the first reference value. In this way, the false code channel is eliminated by using the relationship of the power of a common channel and the possibly configured minimum power of a DPA code channel in this step.

206: Determine whether the symbol energy accumulated value corresponding to the DPA code channel is greater than the third reference value.

If yes, perform step 207.

If not, perform step 208.

The maximum symbol energy accumulated value in the symbol energy accumulated values greater than the first reference value may be multiplied by the third threshold Thd3 to obtain the third reference value.

In addition, the third reference value is mainly used to resist fluctuation of the power of the DPA code channel caused by channel fading and noises. If a transmitting end performs equal power transmission over the DPA code channel, the Thd3 may be set in a range of 0.5 to 1. The Thd3 may be obtained or adjusted through emulation in each scenario.

207: Indicate the DPA code channel as an active code channel.

Based on the determination in steps 204 to 206, it is determined that the symbol energy accumulated value corresponding to the DPA code channel satisfies the active code channel determination condition, so that the DPA code channel is indicated as an active code channel.

208: Indicate the DPA code channel as an inactive code channel.

Based on the determination in step 204, 205 or 206, it is determined that the symbol energy accumulated value corresponding to the DPA code channel does not satisfy the active code channel determination condition, so the DPA code channel is indicated as an inactive code channel.

In an application scenario, the solution of this embodiment may be specifically implemented by a code channel detecting device as shown in FIG. 3. Referring to FIG. 3, an antenna receives a received signal; an equalizer equalizes the received signal to obtain an equalized signal and output the equalized signal; a descrambler descrambles the equalized signal to obtain a descrambled signal and output the descrambled signal; a filter corresponding to a common channel and a filter corresponding to each DPA code channel each despreads the descrambled signal to obtain a despread signal and output the despread signal; and an active code channel detecting unit acquires a symbol energy accumulated value corresponding to each DPA code channel, determines whether the symbol energy accumulated value corresponding to each DPA code channel satisfies an active code channel determination condition, indicates a DPA code channel that satisfies the active code channel determination condition as an active code channel, and indicates a DPA code channel that does not satisfy the active code channel determination condition as an inactive code channel.

It can be understood that, the method of this embodiment may be specifically implemented on an access apparatus (for example, a base station or a relay station), and of course, may be specifically implemented on another apparatus.

In view of the above, in the solution provided by this embodiment, whether a DPA code channel is in an active state is determined with multiple thresholds based on a first reference value, a second reference value and a third reference value, where a first threshold is multiplied by estimated in-band noises to obtain the first reference value; a maximum symbol energy accumulated value in symbol energy accumulated values greater than the first reference value is multiplied by a third threshold to obtain the third reference value; and a second threshold is multiplied by a second symbol energy accumulated value to obtain the second reference value, where the second symbol energy accumulated value is obtained by performing energy accumulation on a symbol acquired after an equalized signal is descrambled and despread using a spreading code sequence corresponding to a common channel. This mechanism takes multiple possible false determination situations into consideration; therefore, even if the current interference is small, the accuracy of the determination can be improved because a noise threshold (related to the current interference) is used in the determination and the relationship of symbol energy accumulated values corresponding to DPA code channels is also used in the determination, thereby ensuring a code channel correct detection rate in multiple interference scenarios and relatively reducing a false alarm rate.

To better understand and implement the foregoing solution provided in the embodiment of the present invention, a related device for implementing the above solution is described below.

Referring to FIG. 4-a, an embodiment of the present invention provides a network apparatus 400, which includes:

an equalizer 410, a descrambling and despreading unit 420, an accumulating unit 430, and an active code channel indication unit 440.

The equalizer 410 is configured to equalize a received signal to obtain an equalized signal.

The descrambling and despreading unit 420 is configured to descramble and despread the equalized signal, which is obtained by the equalizer 410, by using a spreading code sequence corresponding to each DPA code channel.

The accumulating unit 430 is configured to perform energy accumulation on a symbol that is corresponding to each DPA code channel and is acquired after the descrambling and despreading processing of the descrambling and despreading unit 420, to obtain a symbol energy accumulated value corresponding to each DPA code channel.

The active code channel indication unit 440 is configured to indicate the DPA code channel as an active code channel, if the symbol energy accumulated value corresponding to the DPA code channel satisfies an active code channel determination condition.

The active code channel determination condition includes that: the symbol energy accumulated value corresponding to the DPA code channel is greater than a first reference value and greater than a third reference value; or the symbol energy accumulated value corresponding to the DPA code channel is greater than a first reference value and greater than a third reference value, and at least one of symbol energy accumulated values corresponding to DPA code channels is greater than a second reference value, where the first reference value is determined based on a first threshold and estimated in-band noises (for example, the first threshold is multiplied by the estimated in-band noises to obtain the first reference value); the third reference value is determined based on a maximum symbol energy accumulated value in the symbol energy accumulated values greater than the first reference value and a third threshold (for example, the maximum symbol energy accumulated value in the symbol energy accumulated values greater than the first reference value is multiplied by the third threshold to obtain the third reference value); and the second reference value is determined based on a second threshold and a second symbol energy accumulated value (for example, the second threshold is multiplied by the second symbol energy accumulated value to obtain the second reference value), where the second symbol energy accumulated value is obtained by performing energy accumulation on a symbol acquired after the equalized signal obtained by the equalizer 410 is descrambled and despread using a spreading code sequence corresponding to a common channel.

Referring to FIG. 4-*b*, the network apparatus 400 may further include: a first determining unit 450, configured to determine whether the symbol energy accumulated value corresponding to the DPA code channel is greater than the first reference value; if not, determine that the symbol energy accumulated value corresponding to the DPA code channel does not satisfy the active code channel determination condition; while if yes, further determine whether the symbol energy accumulated value corresponding to the DPA code channel is greater than the third reference value; and if yes, determine that the symbol energy accumulated value corresponding to the DPA code channel satisfies the active code channel determination condition; while if not, determine that the symbol energy accumulated value corresponding to the DPA code channel does not satisfy the active code channel determination condition.

In another embodiment, the first determining unit 450 may also be configured to, determine whether the symbol energy accumulated value corresponding to the DPA code channel is greater than the third reference value; if not, determine that the symbol energy accumulated value corresponding to the DPA code channel does not satisfy the active code channel determination condition; while if yes, further determine whether the symbol energy accumulated value corresponding to the DPA code channel is greater than the first reference value; if yes, determine that the symbol energy accumulated value corresponding to the DPA code channel satisfies the active code channel determination condition; while if not, determine that the symbol energy accumulated value corresponding to the DPA code channel does not satisfy the active code channel determination condition. Of course, the first determining unit 450 may also determine whether the symbol energy accumulated value corresponding to the DPA code channel is greater than the first reference value and the third reference value simultaneously, and if yes, determine that the symbol energy accumulated value corresponding to the DPA code channel satisfies the active code channel determination condition; while if not, determine that the symbol energy accumulated value corresponding to the DPA code channel does not satisfy the active code channel determination condition. Alternatively, the first determining unit 450 may also compare the first reference value and the third reference value first, and then determine whether the symbol energy accumulated value corresponding to the DPA code channel is greater than the larger one of the first reference value and the third reference value; if yes, determine that the symbol energy accumulated value corresponding to the DPA code channel satisfies the active code channel determination condition; while if not, determine that the symbol energy accumulated value corresponding to the DPA code channel does not satisfy the active code channel determination condition.

Referring to FIG. 4-*c*, the network apparatus 400 may further include:

a second determining unit 460, configured to determine whether the symbol energy accumulated value corresponding to the DPA code channel is greater than the first reference value; if not, determine that the symbol energy accumulated value corresponding to the DPA code channel does not satisfy the active code channel determination condition; while if yes, further determine whether at least one of the symbol energy accumulated values corresponding to the DPA code channels is greater than the second reference value; if not, determine that the symbol energy accumulated value corresponding to the DPA code channel does not satisfy the active code channel determination condition; while if yes, further determine whether the symbol energy accumulated value corresponding to the DPA code channel is greater than the third reference value; and if yes, determine that the symbol energy accumulated value corresponding to the DPA code channel satisfies the active code channel determination condition; while if not, determine that the symbol energy accumulated value corresponding to the DPA code channel does not satisfy the active code channel determination condition.

In another embodiment, the second determining unit 460 may also be configured to determine whether the symbol energy accumulated value corresponding to the DPA code channel is greater than the third reference value; if not, determine that the symbol energy accumulated value corresponding to the DPA code channel does not satisfy the active code channel determination condition; while if yes, further determine whether the symbol energy accumulated value corresponding to the DPA code channel is greater than the first reference value; if not, determine that the symbol energy accumulated value corresponding to the DPA code channel does not satisfy the active code channel determination condition; while if yes, further determine whether at least one (for example, a maximum symbol energy accumulated value) of the symbol energy accumulated values that are corresponding to the DPA code channels and are greater than the first reference value or the third reference value is greater than the second reference value; if not, determine that the symbol energy accumulated value corresponding to the DPA code channel does not satisfy the active code channel determination condition; while if yes, determine that the symbol energy accumulated value corresponding to the DPA code channel satisfies the active code channel determination condition.

Alternatively, the second determining unit 460 may also first determine whether the symbol energy accumulated value corresponding to the DPA code channel is greater than the third reference value; if not, determine that the symbol energy accumulated value corresponding to the DPA code channel does not satisfy the active code channel determination condition; while if yes, further determine whether at least one of the symbol energy accumulated values that are corresponding to the DPA code channels and are greater than the third reference value is greater than the second reference value; if not, determine that the symbol energy accumulated value corresponding to the DPA code channel does not satisfy the active code channel determination condition; while if yes, further determine whether the symbol energy accumulated value corresponding to the DPA code channel is greater than the first reference value; if not, determine that the symbol energy accumulated value corresponding to the DPA code channel does not satisfy the active code channel determination condition; while if yes, determine that the symbol energy accumulated value corresponding to the DPA code channel satisfies the active code channel determination condition. Alternatively, the second determining unit 460 may compare the first reference value and the third reference value first, and then determine whether the symbol energy accumulated value corresponding to the DPA code channel is greater than the larger one of the first reference value and the third reference value; if not, determine that the symbol energy accumulated value corresponding to the DPA code channel does not satisfy the active code channel determination condition; while if yes, further determine whether at least one of the symbol energy accumulated values that are corresponding to the DPA code channels and are greater than the first reference value or the third reference value is greater than the second reference value; if yes, determine that the symbol energy accumulated value corresponding to the DPA code channel satisfies the active code channel determination condition; while if not, determine that the symbol energy accumulated value corresponding to the DPA code channel does not satisfy the active code channel determination condition.

In another embodiment, the network apparatus 400 may also include: a noise estimating module, configured to descramble and despread the equalized signal obtained by the equalizer 410 using a spreading code sequence corresponding to a common pilot channel CPICH to obtain a symbol corresponding to the CPICH, and estimate in-band noises based on the symbol corresponding to the CPICH.

Referring to FIG. 5, an embodiment of the present invention further provides a communication system, which includes:

a mobility management network element 500 and the network apparatus 400, where the mobility management network element 500 is connected to the access apparatus 400 in a communication mode.

It can be understood that, the modules in the network apparatus 400 provided in the embodiment of the present invention may be integrated or separately deployed. The modules may be combined into one module or may be further divided into multiple sub-modules.

It can be understood that, the network apparatus 400 is an access apparatus (for example, a base station or a relay station) or another apparatus. The function of each functional module of the network apparatus 400 in this embodiment may be specifically implemented according to the method in the above method embodiments. For the specific implementation, the reference can be made to the related description in the above method embodiments, and details are not be repeated herein.

In the above embodiments, the description of each embodiment has its emphasis, and for the part that is not detailed in an embodiment, reference may be made to the relevant description of other embodiments.

In view of the above, in the solutions provided by the embodiments of the present invention, whether a DPA code channel is in an active state is determined with multiple thresholds based on a first reference value and a third reference value, or based on a first reference value, a second reference value and a third reference value, where a first threshold is multiplied by estimated in-band noises to obtain the first reference value; a maximum symbol energy accumulated value in symbol energy accumulated values greater than the first reference value is multiplied by a third threshold to obtain the third reference value; and a second threshold is multiplied by a second symbol energy accumulated value to obtain the second reference value, where the second symbol energy accumulated value is obtained by performing energy accumulation on a symbol acquired after an equalized signal is descrambled and despread using a spreading code sequence corresponding to a common channel. This mechanism takes multiple possible false determination situations into consideration, thereby ensuring a code channel correct detection rate in multiple interference scenarios and relatively reducing a false alarm rate.

Persons of ordinary skill in the art should understand that all or a part of the steps in the method of the embodiments may be accomplished through a program instructing related hardware. The program may be stored in a computer readable storage medium which may include a read-only memory, a random access memory, a magnetic disk, an optical disk, or the like.

The code channel detecting method, the network apparatus and the communication system provided by the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementation and application scopes according to the ideas of the present invention. Therefore, the content of the specification shall not be construed as a limit to the present invention.

What is claimed is:

1. A code channel detecting method, comprising:
  equalizing a received signal to obtain an equalized signal;
  descrambling and despreading the equalized signal using a spreading code sequence corresponding to each downlink packet access (DPA) code channel, and performing energy accumulation on a symbol that is corresponding to the each DPA code channel and is acquired after the descrambling and despreading, to obtain a symbol energy accumulated value corresponding to the each DPA code channel; and
  when the symbol energy accumulated value corresponding to a DPA code channel satisfies an active code channel determination condition, indicating the DPA code channel as an active code channel, wherein the active code channel determination condition comprises that:
    the symbol energy accumulated value corresponding to the DPA code channel is greater than a first reference value and greater than a third reference value; or the symbol energy accumulated value corresponding to the DPA code channel is greater than the first reference value and greater than the third reference value, and at least one of symbol energy accumulated values corresponding to DPA code channels is greater than a second reference value, wherein the first reference value is determined based on a first threshold and estimated in-band noises, and the in-band noises are noises within system working bandwidth corresponding to the DPA code channel; the third reference value is determined based on a maximum symbol energy accumulated value in symbol energy accumulated values greater than the first reference value and a third threshold; and the second reference value is determined based on a second threshold and a second symbol energy accumulated value, wherein the second symbol energy accumulated value is obtained by performing energy accumulation on the symbol acquired after the equalized signal is descrambled and despread using the spreading code sequence corresponding to a common channel.

2. The method according to claim 1, wherein determining the first reference value based on the first threshold and the estimated in-band noises specifically comprises multiplying the first threshold by the estimated in-band noises to obtain the first reference value, wherein determining the third reference value based on the maximum symbol energy accumulated value in the symbol energy accumulated values greater than the first reference value and the third threshold specifically comprises multiplying the maximum symbol energy accumulated value in the symbol energy accumulated values greater than the first reference value by the third threshold to obtain the third reference value, and wherein determining the second reference value based on the second threshold and the second symbol energy accumulated value specifically comprises multiplying the second threshold by the second symbol energy accumulated value to obtain the second reference value.

3. The method according to claim 1, wherein whether the active code channel determination condition is satisfied is determined in the following manner:
  determining whether the symbol energy accumulated value corresponding to the DPA code channel is greater than the first reference value;
  when the symbol energy accumulated value corresponding to the DPA code channel is smaller than the first reference value, determining that the symbol energy accumulated value corresponding to the DPA code channel does not satisfy the active code channel determination condition, and when the symbol energy accumulated value corresponding to the DPA code channel is greater than the first reference value, determining whether the symbol energy accumulated value corresponding to the DPA code channel is greater than the third reference value; and
  when the symbol energy accumulated value corresponding to the DPA code channel is greater than the third reference value, determining that the symbol energy accumulated value corresponding to the DPA code channel satisfies the active code channel determination condition, and when the symbol energy accumulated value corresponding to the DPA code channel is smaller than the third reference value, determining that the symbol energy accumulated value corresponding to the DPA code channel does not satisfy the active code channel determination condition.

4. The method according to claim 3, wherein determining whether at least one of the symbol energy accumulated values corresponding to the DPA code channels is greater than the second reference value comprises determining whether the maximum symbol energy accumulated value in the symbol energy accumulated values that are corresponding to the DPA code channels and are greater than the first reference value is greater than the second reference value.

5. The method according to claim 1, wherein the in-band noises are estimated in the following manner:
  descrambling and despreading the equalized signal using the spreading code sequence corresponding to a common pilot channel (CPICH) to obtain the symbol corresponding to the CPICH; and
  estimating the in-band noises based on the symbol corresponding to the CPICH.

6. The method according to claim 1, wherein the first threshold is set in a range of 0.5 to 1.5; the second threshold is set in a range of 0.08 to 0.2; and the third threshold is set in a range of 0.5 to 1.

7. The method according to claim 1, wherein whether the active code channel determination condition is satisfied is determined in the following manner:
  determining whether the symbol energy accumulated value corresponding to the DPA code channel is greater than the first reference value;
  when the symbol energy accumulated value corresponding to the DPA code channel is smaller than the first reference value, determining that the symbol energy accumulated value corresponding to the DPA code channel does not satisfy the active code channel determination condition, and when the symbol energy accumulated value corresponding to the DPA code channel is greater than the first reference value, determining whether at least one of the symbol energy accumulated values corresponding to the DPA code channels is greater than the second reference value;
  when no symbol energy accumulated value corresponding to the DPA code channel is greater than the second reference value, determining that the symbol energy accumulated value corresponding to the DPA code channel does not satisfy the active code channel determination condition, and when at least one of the symbol energy accumulated values corresponding to the DPA code channels is greater than the second reference value, determining whether the symbol energy accumulated value corresponding to the DPA code channel is greater than the third reference value; and
  when the symbol energy accumulated value corresponding to the DPA code channel is greater than the third reference value, determining that the symbol energy accumulated value corresponding to the DPA code channel satisfies the active code channel determination condition, and when the symbol energy accumulated value corresponding to the DPA code channel is smaller than the third reference value, determining that the symbol energy accumulated value corresponding to the DPA code channel does not satisfy the active code channel determination condition.

8. A network apparatus, comprising:
  an equalizer configured to equalize a received signal to obtain an equalized signal;
  a descrambling and despreading unit configured to descramble and despread the equalized signal using a spreading code sequence corresponding to each downlink packet access (DPA) code channel;
  an accumulating unit configured to perform energy accumulation on a symbol that is corresponding to the each DPA code channel and is acquired after the descrambling and despreading processing of the descrambling and despreading unit, to obtain a symbol energy accumulated value corresponding to the each DPA code channel; and an active code channel indication unit configured to indicate a DPA code channel as an active code channel when the symbol energy accumulated value corresponding to the DPA code channel satisfies an active code channel determination condition, wherein the active code channel determination condition comprises that:

the symbol energy accumulated value corresponding to the DPA code channel is greater than a first reference value and greater than a third reference value; or the symbol energy accumulated value corresponding to the DPA code channel is greater than the first reference value and greater than the third reference value, and at least one of symbol energy accumulated values corresponding to DPA code channels is greater than a second reference value, wherein the first reference value is determined based on a first threshold and estimated in-band noises, and the in-band noises are noises within system working bandwidth corresponding to the DPA code channel; the third reference value is determined based on a maximum symbol energy accumulated value in symbol energy accumulated values greater than the first reference value and a third threshold; and the second reference value is determined based on a second threshold and a second symbol energy accumulated value, wherein the second symbol energy accumulated value is obtained by performing energy accumulation on the symbol acquired after the equalized signal is descrambled and despread using the spreading code sequence corresponding to a common channel.

9. The network apparatus according to claim 8, wherein the first reference value is obtained by multiplying the first threshold by the estimated in-band noises; the third reference value is obtained by multiplying the maximum symbol energy accumulated value in the symbol energy accumulated values greater than the first reference value by the third threshold; and the second reference value is obtained by multiplying the second threshold by the second symbol energy accumulated value.

10. The network apparatus according to claim 8, further comprising a first determining unit configured to:

determine whether the symbol energy accumulated value corresponding to the DPA code channel is greater than the first reference value;

when the symbol energy accumulated value corresponding to the DPA code channel is smaller than the first reference value, determine that the symbol energy accumulated value corresponding to the DPA code channel does not satisfy the active code channel determination condition;

when the symbol energy accumulated value corresponding to the DPA code channel is greater than the first reference value, further determine whether the symbol energy accumulated value corresponding to the DPA code channel is greater than the third reference value;

when the symbol energy accumulated value corresponding to the DPA code channel is greater than the third reference value, determine that the symbol energy accumulated value corresponding to the DPA code channel satisfies the active code channel determination condition; and when the symbol energy accumulated value corresponding to the DPA code channel is smaller than the third reference value, determine that the symbol energy accumulated value corresponding to the DPA code channel does not satisfy the active code channel determination condition.

11. The network apparatus according to claim 8, further comprising a second determining unit configured to:

determine whether the symbol energy accumulated value corresponding to the DPA code channel is greater than the first reference value;

when the symbol energy accumulated value corresponding to the DPA code channel is smaller than the first reference value, determine that the symbol energy accumulated value corresponding to the DPA code channel does not satisfy the active code channel determination condition, and when the symbol energy accumulated value corresponding to the DPA code channel is greater than the first reference value, determine whether at least one of the symbol energy accumulated values corresponding to the DPA code channels is greater than the second reference value;

when no symbol energy accumulated value corresponding to the DPA code channel is greater than the second reference value, determine that the symbol energy accumulated value corresponding to the DPA code channel does not satisfy the active code channel determination condition, and when at least one of the symbol energy accumulated values corresponding to the DPA code channels is greater than the second reference value, further determine whether the symbol energy accumulated value corresponding to the DPA code channel is greater than the third reference value; and when the symbol energy accumulated value corresponding to the DPA code channel is greater than the third reference value, determine that the symbol energy accumulated value corresponding to the DPA code channel satisfies the active code channel determination condition, and when the symbol energy accumulated value corresponding to the DPA code channel is smaller than the third reference value, determine that the symbol energy accumulated value corresponding to the DPA code channel does not satisfy the active code channel determination condition.

12. A communication system, comprising:

a mobility management apparatus and a network apparatus, wherein the mobility management apparatus is connected to the network apparatus in a communication mode, and wherein the network apparatus comprises:

an equalizer configured to equalize a received signal to obtain an equalized signal;

a descrambling and despreading unit configured to descramble and despread the equalized signal using a spreading code sequence corresponding to each downlink packet access (DPA) code channel;

an accumulating unit configured to perform energy accumulation on a symbol that is corresponding to the each DPA code channel and is acquired after the descrambling and despreading processing of the descrambling and despreading unit, to obtain a symbol energy accumulated value corresponding to the each DPA code channel; and an active code channel indication unit configured to indicate a DPA code channel as an active code channel when the symbol energy accumulated value corresponding to the DPA code channel satisfies an active code channel determination condition, wherein the active code channel determination condition comprises that:

the symbol energy accumulated value corresponding to the DPA code channel is greater than a first reference value and greater than a third reference value; or the symbol energy accumulated value corresponding to the DPA code channel is greater than the first reference value and greater than the third reference value, and at least one of symbol energy accumulated values corresponding to DPA code channels is greater than a second reference value, wherein the first reference value is determined based on a first threshold and estimated in-band noises, and the in-band noises are noises within system working bandwidth corresponding to the DPA code channel; the third reference value is determined based on a maximum symbol energy accumulated value in symbol energy accumulated values greater than the first reference value and a third threshold; and the second reference value is determined based on a second threshold and a second symbol energy accumulated value, wherein the second symbol energy accumulated value is obtained by performing energy accumulation on the symbol acquired after the equalized signal is descrambled and despread using the spreading code sequence corresponding to a common channel.

* * * * *